April 11, 1961 J. E. BALINT 2,978,943
PHOTOELECTRIC CONTROL CIRCUIT IN COMBINATION
WITH A TOGGLE ACTUATED CUTTER DEVICE
Filed Sept. 17, 1956 3 Sheets-Sheet 1

INVENTOR
JOHN E. BALINT
BY Frederick V. Bucknop
ATTORNEY

INVENTOR
JOHN E. BALINT
BY Frederick ...
ATTORNEY

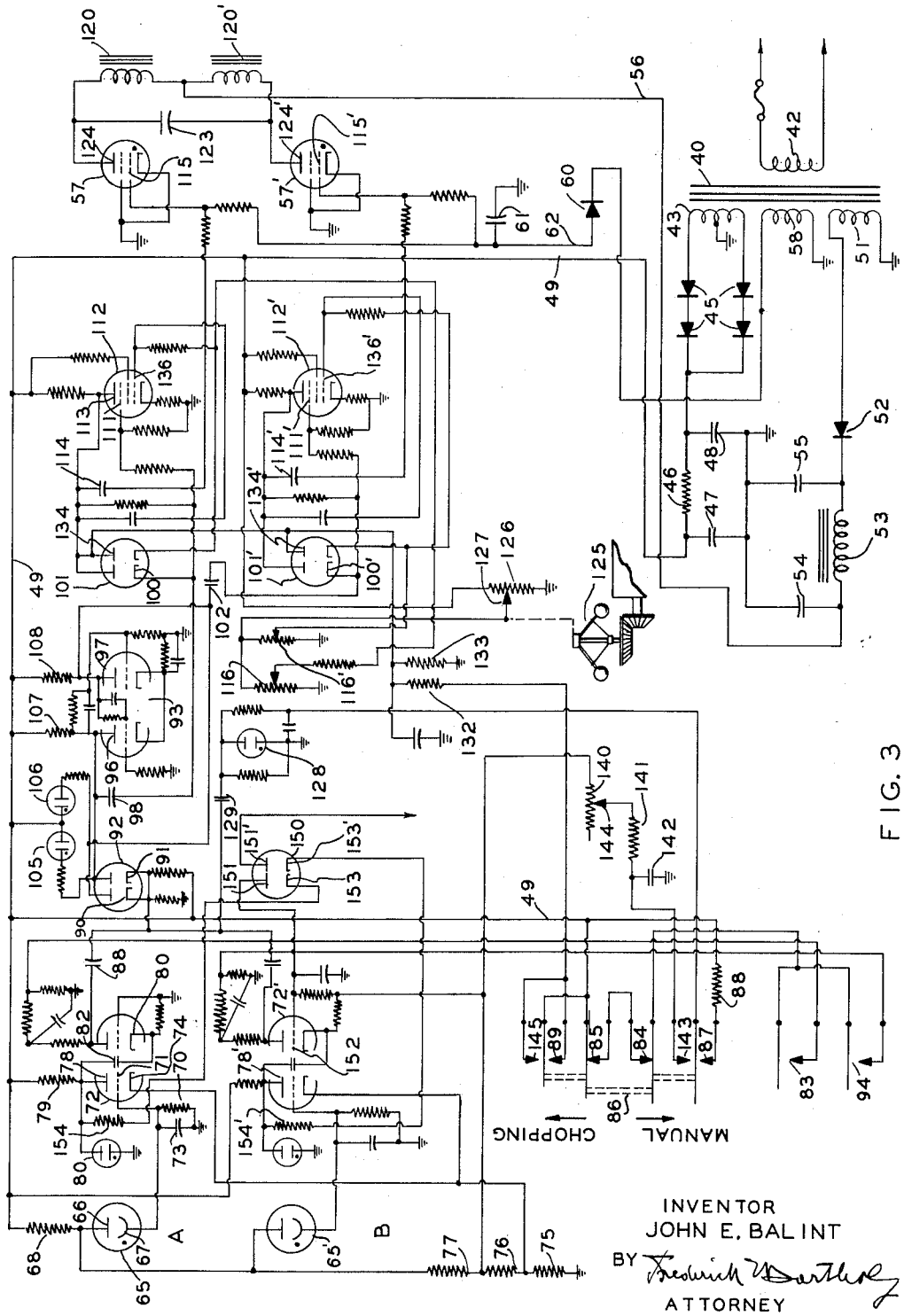

United States Patent Office 2,978,943
Patented Apr. 11, 1961

2,978,943
PHOTOELECTRIC CONTROL CIRCUIT IN COMBINATION WITH A TOGGLE ACTUATED CUTTER DEVICE

John E. Balint, Eugene, Oreg., assignor to Controls & Communications Co., Inc., Eugene, Oreg., a corporation of Oregon Filed Sept. 17, 1956, Ser. No. 610,110

6 Claims. (Cl. 83—362)

This invention relates to electronic control apparatus and more particularly to circuit arrangements for the operational control of sheet material cutting devices.

Various industrial operations require the cutting of sheet material to different sizes by means of a power-operated cutting knife. For example, in the manufacture of plywood, the veneer must be cut to several sizes after it is peeled from the log and this operation entails considerable skill on the part of the cutting knife operator. On his judgment depends the size of cuts resulting in maximum yield from the available raw material.

The present invention is particularly directed to the cutting operation of the plywood material and has, for its primary object, the provision of electronic control apparatus which will assist the operator and relieve him of such functions which are prone to result in human element errors.

It is a particular object of this invention to increase the speed and accuracy in the cutting of sheet material, such as veneer, and, to this end, electronic means are provided for automatically determining the length of cut and timing the actuation of the cutting knife.

A particular feature of the invention is that the sheet material to be cut may travel at various selected speeds, automatic compensation being provided for timing the actuation of the cutting knife in relation to the speed of travel of the material.

Another feature of the invention is that the electronic circuit, in accordance therewith, in addition to its automatic functions, permits manual operation at the discretion of the operator.

Other objects and features will be apparent from the following description of the invention pointed out in particularity in the appended claims and taken in connection with the accompanying drawings in which:

Fig. 3 is a detailed schematic diagram of the circuit illustrating two photoelectric control stages.

As previously mentioned, in the manufacture of plywood, veneer is used which is peeled in a more or less continuous strip of about ⅛ inch thickness from an 8½ foot log. As the sheet of veneer feeds out from the stripping lathe, it is carried along on conveyor belts and thus reaches the infeed table of the cutting or clipping knife.

There are various types of clipping knives as far as physical construction is concerned, but all utilize some form of power operation, either pneumatic or electric. In most cases, the knife is toggle actuated and complete operation is effected when the toggle bar is moved in either direction of its two-directional mode of travel. In other words, these knives have a reciprocating type of movement with suitable individual power means at each end which must be alternately actuated for succeeding cuts.

The circuit herein described is directed to reciprocating operation and is automatically selective in energizing the particular power means of the reciprocating cutting mechanism. However, it may also be used to sequentially control the function of non-reciprocating knives.

Figure 1:
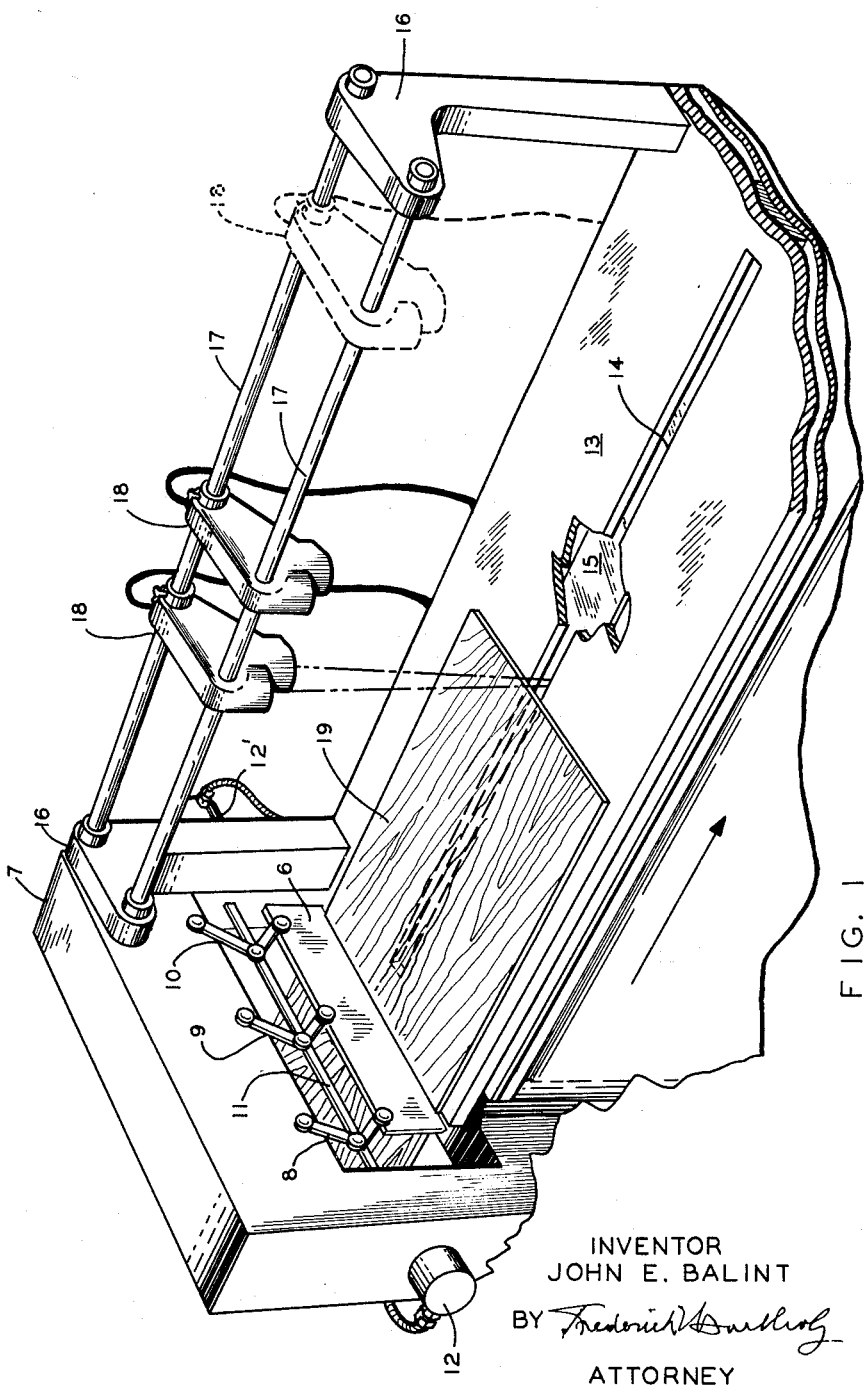
Fig. 1 is a representation in perspective of the cutting knife and outfeed table over which the sheet material travels.

Referring to Fig. 1, it is to be noted that the mechanism for the power actuation of the knife is not shown in detail and the knife itself is only illustratively drawn inasmuch as the invention is not concerned with the knife, per se, nor its mechanical details or mode of actuation.

It is seen that the knife 6 is suspended from a suitable support 7 by means of the toggles 8, 9 and 10 and is actuated when the toggle bar 11 is pulled in either of its two directions, left or right. The pulling force may be exerted by suitable electromagnetic means, such as a pair of solenoids, each placed at opposite ends of the bar 11, or steam or pneumatic pistons 12 and 12′ may perform this function and the electromagnetic device used indirectly to actuate valves and thus direct the power medium to the proper piston.

Figure 2:
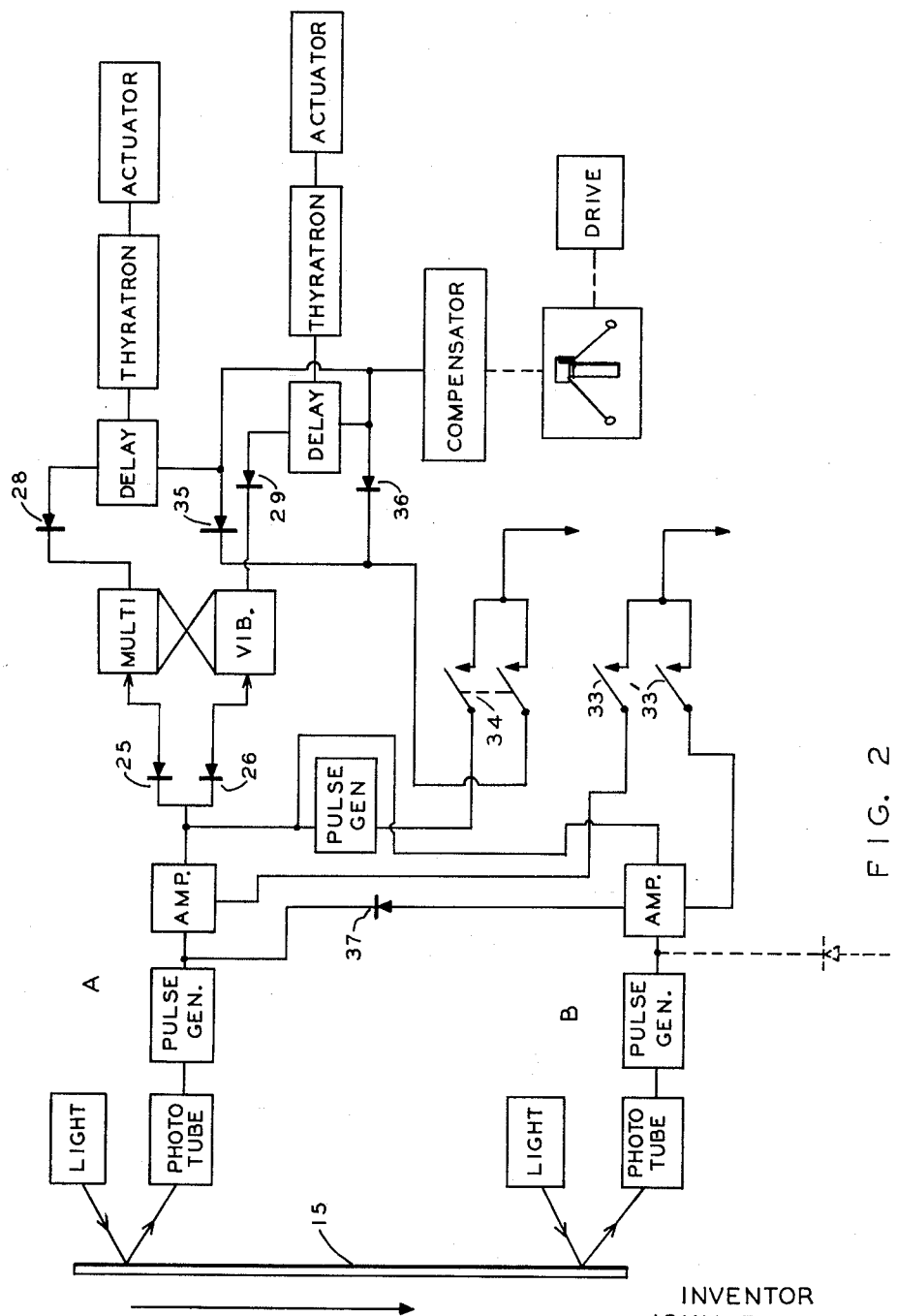
Fig. 2 is a schematic block diagram of the control circuit.

Whatever the case may be, the present invention has the purpose of effecting automatic control of the respective electromagnetic means, such as solenoids, and these are schematically indicated in Figs. 2 and 3 as the electromagnetic actuators.

Continuing with Fig. 1, the knife 6 is placed over an outfeed table 13 which has a centrally positioned slot 14. Underneath the table 13, in alignment with the slot 14, is placed a light reflecting surface 15 which may be of any suitable highly polished material, such as chromium plated steel or a glass mirror. Above the table 13, and running alongside thereof, are placed a pair of supports 16 holding the rods 17 which slidably accommodate a plurality of housings 18, each containing a photoelectrically responsive element, such as a phototube, and a light source physically so spaced and optically so arranged that the beam of light from each light source directed onto the opening 14 will illuminate, by reflection from the surface 15, its associated phototube. The housings 18 may also accommodate associated electronic component elements for the phototube, such as an amplifier, pulse generator, etc., which will be described in detail later.

The sheet material 19 to be cut by the knife 6 is progressively moved in the direction of the arrow by any suitable means, not shown here, over the outfeed table 13 so that when this material has travelled a distance representing the length of cut desired, the knife 6 is actuated to make the cut and return to its original position. It is seen that, as the sheet material 19 travels over the outfeed table 13, it will progressively cover the reflecting surface 15 and will obstruct the light reflected onto the particular phototube placed at the distance where the edge of the material 19 reaches the point of incidence of the light beam. For this reason, the phototube housings are slidably supported on the rods 17 so that each may be placed at a selected distance from the knife to be blanked out by the sheet material 19 when this selected distance has been reached. In other words, the placement of every phototube assembly 18 represents a desired length of cut of the material.

The movement of the sheet material 19 over the outfeed table 13 may be effected in various ways. It is common practice to utilize conveyor belts and a driving motor of variable speed. This has the advantage that cutting may be effected at a higher speed when there is uniformity in the grade of the sheet material; but at a lower speed when more careful consideration must be given to the size of cuts which may be economically made from a poorer grade of material. The selection of the outfeed speed is generally determined by the cutting operator, known as the "clipper."

Further reference may be made to Fig. 1 in connection with the description of the operation of the control system, a general understanding of which will now be gained by referring to the block diagram of Fig. 2 which shows the interconnection of the major circuit elements, the function of each being indicated within the blocks.

It was mentioned that, for each length of cut, there is placed a photoelectrically responsive element at the distance from the knife which represents the desired length and that these photoelectric elements are easily moved by being slidably mounted along the path of travel of the sheet material. There may be as many of such photoelectric elements as sizes of cuts needed but, for the purpose of illustration, only two are shown in Figs. 2 and 3. Since each represents a length of cut, and each operates individually, illustrating more than two would be unnecessarily repetitious.

Cutting stage A comprises the light source and the phototube, so arranged that light from the source is reflected by the mirror 15 onto the phototube until the sheet material which travels in the direction of the arrow obstructs the light beam. The output of the phototube is applied to a pulse generator which, under dark current condition of the phototube, generates a negative pulse. This pulse is amplified by the amplifier and is conducted to a pair of trigger diodes 25 and 26 which transmit the pulse to a bistable multivibrator, often referred to as a "flip flop" circuit. One output of the multivibrator is fed through diode 28 to a delay circuit, which is preferably in the form of a phantastron, and the output of the latter is utilized to control the firing of a thyratron which, in turn, energizes its associated electromagnetic actuator, be it a solenoid or similar device which effects the cutting movement of the knife.

The alternate output of the multivibrator is applied through diode 29 to another delay circuit which controls the firing of another thyratron for energizing its associated actuator so as to effect the reciprocal cutting movement of the knife. Cutting stage B has the same component elements and the output of its amplifier is in parallel with that of stage A.

Only one of the cutting stages is in operation at any one time, in that the stage representing the desired cut is energized by depressing the particular cutting switch 33 or 33', the former applying, for example, anode power to the amplifier of stage A and, the latter, to the amplifier of stage B.

Means are also provided for making individual cuts, at any time, at the will of the clipper, irrespective of the state of phototube conductivity or the travel of the sheet material. This is effected by actuating the manual cut switch 34 which applies energizing voltage to a separate pulse generator, the output of which is applied also to diodes 25 and 26.

The purpose of the delay circuit will be explained hereinbelow. It should be mentioned here, however, that, when manual cuts are to be made, the operation of the knife should be as instantaneous as possible upon closure of the switch 34. To this end, the latter controls also an auxiliary circuit which applies bias voltage through isolation diodes 35 and 36 to both delay circuits so as to disable their delay function.

The local pulse generator for manual cut operation may also be converted into a relaxation oscillator to generator to generate pulses at a predetermined frequency and cause recurrent operation of the knife. The purpose of this is to cut up poorer grade or waste material rapidly into small strips.

It is to be noted also that an interlocking circuit is provided between the pulse generator of stage A and the amplifier of stage B represented by the diode 37, and a similar circuit would interconnect the pulse generator of stage B with that of the amplifier of the succeeding stage as shown by dotted line connection and outline of a diode element.

The relaxation oscillator feature and the purpose and operation of the interlock will be described in detail in connection with Fig. 3.

Taking in the overall operation of the system shown in Fig. 2, consideration must be given to the fact that when the sheet material, moving at a given speed, obstructs the light of the phototube so as to initiate a pulse, the action of this pulse should not be instantaneous for the operation of the knife. The reason for this is that kinetic inertia of the mechanical mass comprising the knife, and the response of the mechanical components which govern the actuation of the knife introduce errors which would affect the accuracy of sequential cuts. It was found advantageous to provide means whereby exactly adjustable amounts of time delay can be inserted between the photoelectric measurements of the length of cut and the time the actual cut is made. This permits compensation for the variations in the operation of the knife mechanism which would make alternate cuts differ in length. Particularly since most knife mechanisms have reciprocating motion, exact balance between alternate movements can seldom, if ever, be obtained in practice; hence, compensation is herein provided by the electronic time delay which is adjustable for each of the reciprocating movements.

Since a definite time interval exists between the instant of measurement and the instant the cut is completed, the material to be cut will travel a given distance during this time. The distance traveled is a function of the rate of material travel. If the rate of material travel is changed, a change will take place in the length of the material that is cut. By introducing a controlled time delay in correspondence with the change in material speed, compensation for variations in length of cut due to changes in speed is attained. The formula for this is as follows:

(1) $$L = S(a+b)$$

where $L$ = length of material travel between light interruption and cut
$S$ = speed of material travel
$a$ = mechanical delay of the knife
$b$ = the delay introduced in the circuit In order to keep L constant in the above formula, it is necessary to vary $b$ as $S$ is changed according to the formula:

(2) $$b = \frac{L - Sa}{S}$$

The time delay $b$ is preset to correspond to selected rates of material travel or made continuously variable to correspond to a continuously variable rate of material travel.

It was mentioned before that, when the invention is applied to cutting of plywood material, the efficiency of operation can be considerably increased if the speed of travel of the sheet material is varied so that when the material is of such quality that it will yield good cuts of certain size the travel can be speeded up. Under such conditions, the time delay circuit must also be adjusted to compensate for the change of speed. This may be automatically effected, as schematically indicated, by utilizing an intercoupling with the driving mechanism of the sheet material which is responsive to variations in speed. This may take the form of a centrifugal governor, or any other suitable device, which, in turn, may change the position of a suitable compensator which alters the response time of the delay circuits. In this manner, the time delay becomes automatically varied as the speed of travel of the material changes.

Referring now to Fig. 3, consideration will be given in more detail, by way of example, to certain circuits which may be utilized to perform the function of the components shown in the block diagram of Fig. 2. The control circuits may receive operating power from a conventional rectified and filtered A.C. power supply, including a power transformer 40 of which the primary winding 42 is supplied with commercial alternating current. The secondary winding 43 supplies the high voltage necessary for the operation of the anode circuits of certain tubes utilized in the system and includes the bank of rectifiers 45 in a full wave rectifier arrangement, filter resistor 46 and filter condensers 47 and 48. The high potential side is distributed to the various components by means of the conductor 49 and, the negative side, tied to the common return indicated by the grounding symbol. Another high voltage supply is derived from the secondary winding 51 in a conventional manner, including the rectifier 52, filter choke 53, and filter condensers 54 and 55. The high potential side is distributed over the conductor 56 to a pair of gaseous discharge tubes 57 and 57' of the thyratron type.

The heater connection to the various tubes is not shown here, it being well understood that thermionic vacuum tubes require filament current. Another secondary winding 58 of the transformer 40 is utilized as a source to supply bias voltage to the discharge tubes 57 and 57'. This is effected by the rectifier 60 and filter condenser 61, and is distributed over the conductor 62 which connects to the grid returns of the tubes 57 and 57'.

Referring to cutting stage A, the phototube 65 having anode 66 and cathode 67 is conventionally connected between the high voltage distribution conductor 49 and ground in series with the voltage dropping resistor 68 and the resistor 70, the latter being connected to the grid electrode 71 of the first triode section of the amplifier tube 72. A suitable capacitor 73 is shunted across resistor 70.

The first triode section of amplifier tube 72 includes the cathode 74 which connects to the junction point of resistors 75 and 76 which, in series with resistors 77 and 68, form a voltage divider across the high voltage supply. The anode 78 connects to the supply line 49 through the anode resistor 79. A branch circuit, effectively shunting the anode 78 and the cathode 74, is formed by a gaseous discharge tube 80 of the cold cathode type and performs the function in connection with the first triode section of the tube 72 of generating a negative pulse when the phototube 65 undergoes a change in conductivity due to removal of luminous excitation from its cathode 67. This pulse is generated in the following manner. When the phototube 65 is illuminated by the exciter lamp (Fig. 2), it conducts and the current produces a positive voltage across the resistor 70 which is applied to the grid 71, causing the first triode section to conduct. The anode current lowers the anode voltage below the operating voltage of the discharge tube 80. The instant the sheet material 19 (Fig. 1), in passing, obstructs the light excitation of the phototube 65, current conductivity ceases and the positive bias is removed from the grid 71. The first triode section now is cut off due to the cathode bias across resistor 75 and anode voltage rises until firing potential of the discharge tube 80 is reached which, when fired, drops the potential of the anode 78 to that of the operating potential of the discharge tube 80. Thus, the difference between the firing potential and the operating potential of the tube 80 produces a pulse which is negative with respect to the voltage of the anode 78. This pulse is applied over the coupling condenser 82 to the cathode 81 of the second triode section of the tube 72. Upon re-excitation of the phototube 65, the first triode section will again conduct and the lowering of the anode voltage extinguishes the discharge tube 80.

The second triode section of the tube 72 is connected in a conventional manner as a cathode-coupled amplifier and need not be described in greater detail. It is to be noted that operating anode voltage is only applied to the second triode section when the switch 83 is closed and provided that the normally closed contacts 84 and 85 of the switch 86 remain closed. The switch 83 is the "automatic" cut switch and is closed by the clipper when cuts of the length determined by the placement of the phototube 65 are to be made automatically. The pulse in amplified form is then transferred by means of the coupling condenser 88 to the cathodes 90 and 91 of the duo-diode tube 92, which functions as the trigger diode for the bistable multivibrator 93.

The purpose of the multivibrator 93 is to act as an electronic switch and to transfer the pulse sequentially into one or the other of the two utilization circuits upon being triggered by consecutive pulses received from the amplifier of any one of the cutting stages. The amplifiers are connected in parallel so that the pulse of any one under operation is applied to the cathodes 90 and 91 of the diode 92.

The cutting stage B is identical, as to circuit components, with that of A and operates in the same manner when the automatic cut switch 94 is depressed so as to supply anode voltage to the amplifier section of the tube 72'. The connection to the anode supply conductor 49 of the switch 94 is effected also through the normally closed contacts 84 and 85 of the switch 86. The purpose of this will be explained when considering the manual cutting and chopping operations.

The circuit elements associated with the multivibrator 93 are conventional and the operation thereof is now well understood. A detailed description may be found by referring, for example, to pages 164–166 of the book entitled "Waveforms," which is vol. 19 of the Massachusetts Institute of Technology's Radiation Laboratory Series, published by McGraw-Hill Book Co., 1949 edition.

It will be understood that the pulse applied to the trigger diode 92 produces conductivity in either triode section 96 or triode section 97 of the multivibrator 93, whichever happened to be in a non-conducting state at the time of application of the pulse. If the conductivity so initiated pertains to triode 96, the negative pulse generated therein will be transferred from the anode circuit thereof through the coupling condenser 98 to the cathode 100 of diode 101 and to the anode 113 of the tube 112; whereas, if the conductivity is initiated in the triode section 97, then the pulse is transferred through the coupling condenser 102 to the cathode 100' of the diode 101' and to the anode 113' of the tube 112'.

Gaseous discharge tubes 105 and 106 are in effect connected in shunt with the anode resistors 107 and 108 of the triodes 96 and 97, respectively, and serve to indicate which of the triodes is conducting, in that a portion of the anode current of the conducting tube will pass through its associated discharge tube. The flashing of these tubes as alternate conductivity is produced by the incoming pulses is a good indication of the proper functioning of the sensing portion of the circuit.

The diode 101 represents the input element of the first utilization circuit and, the diode 101', the input element of the second utilization circuit. Both of these circuits are identical and the output of the one actuates the knife in one of its reciprocating motions and the output of the other in the other of its reciprocating motions. It will suffice, therefore to describe only one of the circuits, let us say, the one which is associated with diode 101.

Prior to transmitting the pulse for the firing of the thermionic gaseous discharge tube 57, a delay circuit is introduced, consisting of the vacuum tube 112 connected in a voltage controlled linear time modulation circuit, known as a "phantastron." Circuits of this type are also described in the above-mentioned reference book, particularly on pages 195–204, consequently this circuit need not be described here in greater detail. Suffice it to say that the negative pulse applied to the anode 113 of the tube 112 over the coupling condenser 98 will appear as a positive pulse in the output circuit of the anode 113 after an elapsed time of predetermined and variable duration, and is then applied over condenser 114 to the grid 115 of the thyratron type gaseous tetrode 57. The variation of the time delay is effected by adjustment of the bias of the control grid 136 of the tube 112 by means of the potentiometer 116.

The tubes 57 and 57' provide the current necessary to energize the electromagnetic actuators 120 and 120' which operate the knife mechanism. When, for example, the grid 115 is driven positive, so as to overcome the cut-off bias voltage supplied by the rectifier 60, the tube will fire and the current produces the magnetic force to effect operation of the cutting knife. Since, after operation, the knife undergoes complete down and up movement, it is necessary that it be pulled in the other direction for the ensuing operation. Inasmuch as the multivibrator 93 is now changed over to the alternate conductivity, the next pulse will be directed to the second utilization circuit, namely, through condenser 102 to diode 101' and anode 113' of the vacuum tube 112' and after the time delay of this circuit, preset by potentiometer 116', the pulse is conducted over condenser 114' to the grid 115' of the discharge tube 57' which, in turn, will energize the actuator 120', causing the reciprocating movement of the knife.

It is to be noted that the discharge tubes 57 and 57', being of the thyratron type, remain conducting once conductivity has been established. However, the condenser 123, connected between anodes 124 and 124', automatically extinguishes the conducting tube the instant the other fires, by virtue of the fact that current conductivity initiated in the non-conducting tube lowers the anode voltage of the conducting tube by discharging condenser 123.

An important feature of this invention, as mentioned before, is that automatic compensation is obtained as to the time delay effected in accordance with the change in speed of travel of the sheet material over the outfeed table. This may be obtained by a simple mechanism, schematically shown here, comprising a centrifugal type governor 125 driven by any suitable coupling with the sheet material feed belts. A potentiometer 126 is so connected in the circuit that the rider 127 thereof, moved by the raising or lowering of the governor, controls the effective bias of the grids 136 and 136'. This is independent from the individual adjustments of the delay bias by means of potentiometers 116 and 116'. While the two utilization circuits may have different time delays with respect to each other, as preset by the latter potentiometers; in addition, a change in this bias will be made by the setting of potentiometer 126 according to the change in the speed of travel of the material.

The cutting operator may, on several occasions, desire to effect individual, so-called, "manual" cuts, not dependent at all on the placement of the phototubes 65 and 65'. This is simply obtained by depressing the switch 86 in the direction of the arrow indicating "manual." The switch 86 controls several circuits, namely, contacts 87, when closed, supply operating potential in series with a voltage dropping resistor 88 to a conventional cold cathode gaseous discharge tube 128. The pulse generated thereby is applied, by means of condenser 129, to the cathodes 90 and 91 of the trigger diode 92 in the same manner as pulses derived from the phototube pulse generating means. Since, in effecting manual cuts, no time delay is necessary, the switch 86 has another pair of contacts 89 which, when closed, connect the high voltage supply 49 to a voltage divider formed by resistors 132 and 133, the junction point of which connects to the anodes 134 and 134' of the second diode section of the tubes 101 and 101', respectively. The voltages are so proportioned that conductivity in the diode sections places sufficient bias on the control grids 136 and 136' as to cause substantially zero delay response of the tubes 112 and 112'.

Mention was made of the fact that, aside from individual cuts, the control system may also be used to provide rapid cutting or chopping up of the sheet material. This is effected by closing the switch 86 in the direction of the arrow indicating "chopping." In this position, the gaseous discharge tube 128 is converted from a single pulse generator into a relaxation oscillator of a frequency determined by the total value of resistors 140 and 141 in series and condenser 142. These components are now placed in the circuit of the tube 128 by closure of contacts 143 of the switch 86.

The pulses, so generated, are applied through the condenser 129 to the circuit in the same manner as the single cut pulse or pulses derived from phototube actuation. The speed of chopping is controlled by adjusting the rider 144 of the resistor 140 which changes the time constant of the relaxation oscillator circuit.

In the chopping position of the switch 86, the time delay is also substantially eliminated in that contacts 145, now closed, complete the circuits for biasing the grids 136 and 136' of the delay tubes 112', respectively. It should also be noted that, in both alternate closed positions of the switch 86, contacts 84 or 85 will be opened, thus interrupting the current supply to the automatic cut switches 83 and 94. In this manner, phototube actuation is prevented, even if any one of the automatic cut switches be closed. In other words, the manual cut or the chopping operation is controlling over any automatic cutting.

A third, but no less important feature, will now be described. It should be visualized that, as a piece of material, after being cut, progresses over the outfeed table, it will successively obstruct the light of phototubes placed along its passage. If a long cut is to be made after a short piece of material has been cut, the latter, arriving at the next dimension determining phototube, would trigger it and thereby produce a false cut for the desired longer piece. An interlocking or "lock-out" circuit is therefore provided which will prevent operation of any one stage as long as the preceding stage is illuminated. This is obtained by the duo-diode 150, of which the anode 151 connects to the control grid 152 of the second triode of tube 72' and the cathode 153 of diode 150 connects to the anode 78 of the tube 72 in series with a suitable resistor 154. Similarly, the cathode 153' of the second section of the diode 150 is connected in series with resistor 154' to the anode 78' of the first triode section of the tube 72'. The circuit of the anode 151' of the diode 150 is not completed in that it would go to the grid of the next amplifier tube of the next phototube stage, not illustrated here, and so forth. The function of diode 150 is simply to provide a cut-off bias for the amplifier stage which is controlled by the conductivity of the first triode section of the preceding stage. It is seen that, as long as the first triode section of tube 72 is conducting, which occurs when phototube 65 is illuminated, the cathode 153 of the diode 150 is at a potential more negative than the anode 151 and thus current conductivity applies a bias of approximately the voltage drop existing across the resistor 76, sufficient is disable the amplifier tube 72' from operation even though its anode 87' be supplied with anode voltage by closure of the switch 94. This tube cannot operate and no pulse can be transmitted, originating from stage B, i. e., phototube 65', unless, and until, light excitation of phototube 65 has been removed by blanking out the exciter light beam by the sheet material which is to be used for the next selected cut.

From the above description of the various circuits and their functions, the operation of the system becomes quite clear. The sheet material traveling under the knife will automatically be cut to the particular length which corresponds to the placement of a phototube, provided that the amplifier associated therewith is in operating condition, first, by closure of the automatic cut switch applying anode potential to it and, second, by darkened condition of the preceding phototube or phototubes.

Proper setting of the time delay adjustment for each utilization circuit assures knife actuation at the instant when the length of cut desired is under the knife. In practical operation, it was found that an accuracy in the dimension of cut of better than one-eighth of an inch could be obtained for extended periods without any adjustments.

I claim:

1. In the cutting operation of sheet material which progressively moves at preselected speeds over a support and under a knife, means mounting said knife for reciprocal operation transversely and vertically for cutting said sheet material during each reciprocal operation, an electronic control circuit for determing the length of cut of said material and for timing and initiating the reciprocal actuation of said knife, including a plurality of phototubes adapted to be placed along the path of travel of said material, the particular placement of each of said phototubes determining the length of the desired cut, means for illuminating said phototubes, said illuminating means being so arranged as to be obstructed by said material upon progressively reaching the position of said phototubes, pulse generating means associated with each of said phototubes and an amplifier connected thereto for amplifying the generated pulse, switching means for selectively energizing the amplifier associated with the particular phototube placed at the distance of the desired cut, pulse transfer means having bi-directional transfer characteristics of alternate conductivity, circuit means for applying said amplified pulse to said transfer means, a first pulse delay means, and pulse responsive electronic means associated therewith, a first power means for actuating said knife upon response of said electronic means in one of said reciprocal operation; a second pulse delay means and pulse responsive electronic means associated therewith, a second power means for actuating said knife in the alternate of said reciprocal operations upon response of said second pulse responsive means, and a circuit interconnecting said first delay means with said transfer means for one of said conductive operations, and a circuit interconnecting said second delay means with said transfer means for said alternate conductive operations.

2. A circuit in accordance with claim 1 wherein said means having bidirectional transfer characteristics of alternate conductivity comprise a pair of vacuum tubes connected to function as a multivibrator having bistable operational characteristics.

3. A circuit in accordance with claim 1 wherein said delay means comprise a vacuum tube stage connected as a phantastron.

4. A circuit in accordance with claim 1 wherein said pulse responsive electronic means comprise a pair of gaseous discharge tubes, and said power means each comprises a solenoid in the anode circuit of said tubes, respectively.

5. A circuit in accordance with claim 1 wherein said pulse generating means comprise a vacuum tube having anode, cathode and grid electrodes, a source of potential between said anode and said cathode including a load resistance, a source of negative potential between said grid and said cathode and a grid load resistance, a phototube connected between said source of potential and said grid and a gaseous discharge device between said anode and said cathode.

6. A circuit in accordance with claim 1 wherein said lock-out circuit comprises a unidirectional current conductive path between the pulse generating means of one stage and the amplifier of a succeeding stage, including an impedance over which a bias voltage is developed for said amplifier disabling operation thereof until said pulse generating means of a preceding stage becomes operable due to obstruction of the illumination of said phototube by said material.

References Cited in the file of this patent

UNITED STATES PATENTS

| | | |
|---|---|---|
| 2,309,329 | Power | Jan. 26, 1943 |
| 2,429,500 | Wolfner | Oct. 21, 1947 |
| 2,458,612 | Luzzato et al. | Jan. 11, 1949 |
| 2,518,325 | Hurley | Aug. 8, 1950 |
| 2,529,161 | Keiling et al. | Nov. 7, 1950 |
| 2,563,213 | Coleman | Aug. 7, 1951 |
| 2,598,721 | Porter | June 3, 1952 |
| 2,623,589 | Price et al. | Dec. 30, 1952 |
| 2,627,347 | Power | Feb. 3, 1953 |
| 2,635,746 | Gordon | Apr. 21, 1953 |
| 2,655,994 | Vandenberg | Oct. 20, 1953 |
| 2,657,258 | Hester | Oct. 27, 1953 |
| 2,719,941 | Presenz | Oct. 4, 1955 |
| 2,758,649 | Anderson et al. | Aug. 14, 1956 |